March 5, 1957   W. HALLIDAY ET AL   2,784,325
NON-DESTRUCTIVE TESTING OF SOLID BODIES
Filed Dec. 12, 1952   2 Sheets-Sheet 1
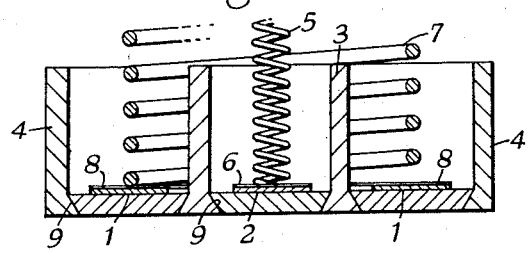
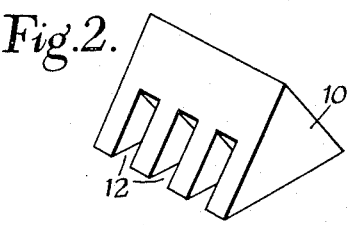
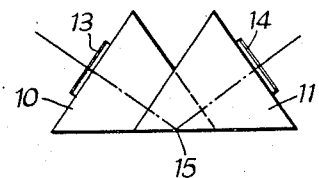
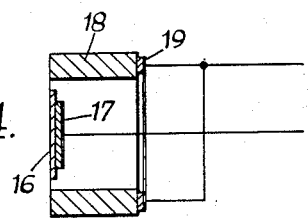
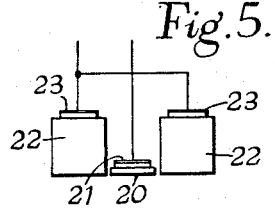
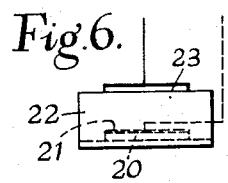
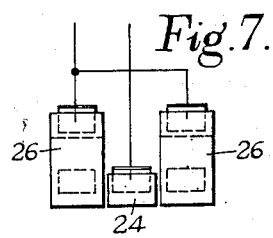
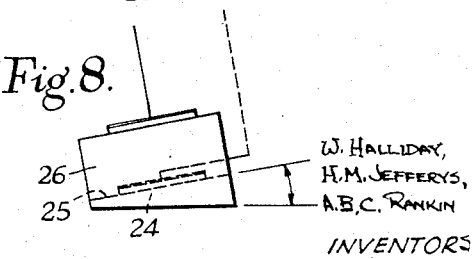
W. HALLIDAY,
H. M. JEFFERYS,
A. B. C. RANKIN
INVENTORS
BY *Moow & Hall*
ATTORNEYS

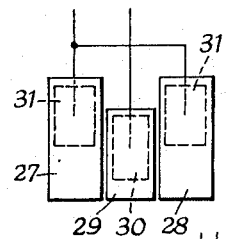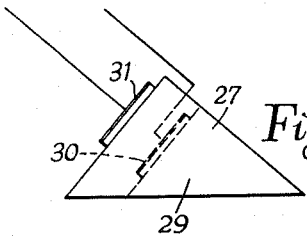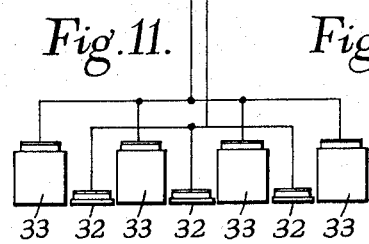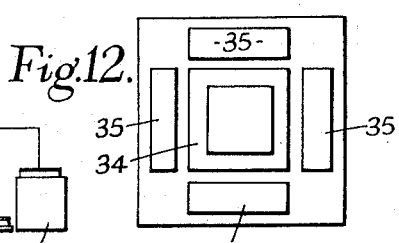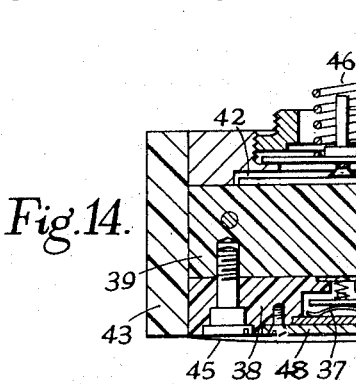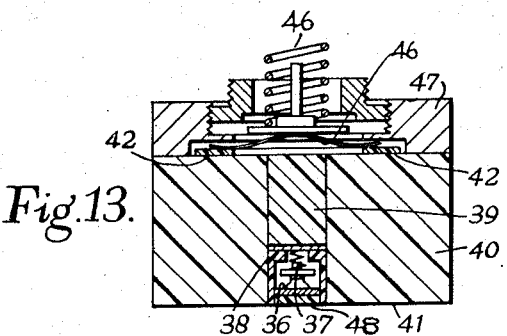

United States Patent Office 2,784,325
Patented Mar. 5, 1957

2,784,325
NON-DESTRUCTIVE TESTING OF SOLID BODIES

William Halliday and Herbert Martin Jefferys, Barkingside, England, and Alexander B. C. Rankin, Hillington, Glasgow, Scotland, assignors to Kelvin and Hughes Limited, Glasgow, Scotland, a company of Great Britain Application December 12, 1952, Serial No. 325,501

Claims priority, application Great Britain December 13, 1951

1 Claim. (Cl. 310—8.1)

The present invention relates to the non-destructive testing of solid bodies, particularly but not exclusively metal bodies.

In order to test solid bodies for flaws such as blowholes in castings, faults in welded joints and other flaws in cast and wrought materials it has been proposed to apply mechanical vibrations of ultrasonic frequency to the body and to examine the effects of the body on the propagation of these vibrations. Examples of this method of testing are given in the book entitled "Ultrasonics" by B. Carlin published in 1949 by the McGraw Hill Book Company Inc.

The present invention is concerned with this method of testing, which will be referred to hereinafter as the non-destructive acoustic method.

Two principal non-destructive acoustic methods of testing have been proposed. In a first of these methods it has been proposed to employ separate devices for generating and applying the oscillations to the body and for receiving the vibrations after reflections from discontinuities in the body respectively. In the second of the two methods a common transducer is used for the generation and reception of the ultrasonic vibrations. An advantage of the first-mentioned method is that there is no direct electrical coupling between the transmitter and receiver used in making the test. In the second mentioned case the receiver, being electrically connected with the transmitter, is liable to be overloaded by the propagated oscillations unless steps are taken to ensure otherwise. Difficulty has been experienced, however, in exploring a body at shallow depths when using the first method. This arises from the fact that when two directional transducers are used for applying and receiving vibrations, the beam of the transmitter does not overlap the sensitive zone of the receiver sufficiently near the surface. This difficulty is of course overcome by the second method but then, although proposals have been made for overcoming the overloading effect of the propagated oscillations on the receiver it is difficult to arrange that the receiving system recovers soon enough after the transmission to allow of the reception of echo signals from very short ranges. Balancing methods may be used but accurate adjustment is necessary in, say, balanced networks and because of the changes in load on the transmitter when different parts of a surface of a body to be tested are explored, the difficulties in obtaining an accurate balance are sometimes substantial.

An object of the present invention is to provide improved apparatus for use in making non-destructive acoustic tests in which the aforesaid difficulties can be substantially reduced.

According to the present invention apparatus for use in a non-destructive acoustic method of testing a solid body comprises at least two vibratory members for use respectively in transmitting vibrations to and receiving vibrations from a body to be tested, one of the members being at least partly embraced by another or the shape of the members being such that in operation one of the members can be at least partly embraced by another. The said members may be piezo-electric transducers or members for transmitting vibrations to and from piezo-electric transducers respectively.

A number of embodiments of the invention are illustrated in the accompanying drawings comprising Figures 1 to 14 all being diagrammatic representations.

Referring to Fig. 1 the embodiment here illustrated is a transducer comprising two piezo-electric crystals. A first of the crystals 1 is of annular shape and surrounds the second crystal 2, which is of disc shape. The crystal 2 of disc shape is fitted in one end of and coaxially with a cylindrical housing 3 of brass. The annular shaped crystal 1 is fixed in one end of and coaxially with a second brass cylinder 4 which is concentric with the first cylinder 1 and the arrangement is made such that the crystal 2 of disc shape is surrounded by the crystal 1 of annular shape. An electrical connection is made to the disc shaped crystal 2 by means of a helical spring 5 passing through the centre of the first cylinder 3 and bearing against a metallised surface 6 of the disc-shaped crystal 2. The second connection to this crystal 2 is made through the first brass cylinder 3. A connection is made to the annular-shaped crystal 1 through the second brass cylinder 4 and the other connection is made by a further helical spring 7 which is disposed outside of and is insulated from the first cylinder 3 and bears against a metallised surface 8 of the annular-shaped crystal 1. If desired the periphery of the outer crystal 1 and the inner crystal 2 may be bevelled as shown at 9 in Fig. 1 and the ends of the two brass cylinders 3 and 4 bevelled in a like manner so that the crystals 1 and 2 are readily supported by the mating bevelled portions of the crystals and two sleeves respectively. By using such an arrangement for supporting the crystals the metallising 6 and 8 on the surfaces thereof against which the connecting springs 5 and 7 bear can be made complete over the whole of the surfaces of the crystals, it being necessary merely to provide some electrical insulation between the edges of the crystal and the wall of the cylinder in each case.

In an alternative arrangement in which one transducer at least partly embraces another, one transducer may be a crystal in the form of a number of spaced parts which are connected to a common terminal and the other transducer may be a crystal in one or a number of parts, the second crystal or each part thereof being disposed between parts forming the first crystal.

It will be appreciated that the two crystals may take many other forms in which one is either partly or completely surrounded by the other.

It will be appreciated that in a transducer of this type the axes of the transmitting and receiving crystals can be made coincident or substantially so. It may of course be necessary to provide suitable acoustic insulation between the crystals and electrical screening may also be found to be necessary.

In Figs. 2 and 3 is illustrated an embodiment of the invention comprising two probes in the form of prism-shaped bodies 10 and 11 these bodies being provided on one edge with slots 12 the position of the slots in the two bodies being complementary so that the two blocks 10 and 11 may be interengaged with one surface of each in a common plane as shown in Fig. 3. On the surfaces of the blocks opposite to the slots 12 are applied quartz crystals 13 and 14 and the arrangement is such that the axes of the beam of the transmitting transducer 13 and the sensitive zone of the receiving transducer 14 may be made to intersect near to the surface of the body to be tested, e. g. as indicated at 15 in Fig. 3.

It may in some cases be found necessary to provide some degree of acoustic screening between the mated portions of the two probes 10 and 11. This may be effected by the use of thin strips of cork against the walls of the slots 12.

Another method of effectively reducing the acoustic coupling between the two members is to arrange that the spacing between them differs from place to place. For example in the arrangement described above with reference to Fig. 1, where two crystals are used, one of annular shape and the other of disc shape, instead of arranging these two crystals coaxial relatively to one another they may be eccentric whereby oscillations travelling from one to the other do so over different path lengths and hence produce voltages of different phases across the crystals which can be arranged to cancel one another. This technique may be applied to any of the other embodiments of the invention and to any other non-destructive method of testing in which two or more vibratory members are employed.

The present invention further includes constructions of the improved apparatus such as to provide improved acoustic screening between a transmitting transducer and a receiving transducer.

For this purpose apparatus suitable for use in the non-destructive acoustic testing of solid bodies, comprises two probe assemblies of different lengths, one of the probe assemblies being at least partly embraced or surrounded by the other, the lengths of the probe assemblies being the mean lengths measured in the direction in which vibrations are propagated therethrough.

In the embodiment shown in Fig. 4 the transmitting probe may be in the form of a flat disk 16 having a transmitting transducer 17 mounted on the top thereof and the receiving probe may be in the form of a cylinder 18 whose lower end surrounds the transmitting transducer 16 and probe 17. A receiving transducer 19 of annular form is affixed to the top of the cylinder 18.

In another arrangement as shown in Figs. 5 and 6 the transmitting probe may be in the form of a thin slab 20 with the transmitting transducer 21 mounted on the top face thereof, a receiving probe assembly being provided in the form of two probes 22 of block form disposed one on each side of the transmitting probe 20, 21. The height of the receiving probe blocks 22 is made substantially greater than the thickness of the transmitting slab-type probe 20, 21, and the receiving transducer assembly is in two parts 23 which are mounted on the tops of the two receiving probe blocks 22 respectively.

In the arrangement shown in Figs. 7 and 8 the transmitting probe may be a wedge-shaped block 24 providing an upper surface 25 inclined to the face of the test piece and the receiving probe assembly may be formed of two wedges 26 whose dimensions are greater than those of the transmitting probe blocks 24. The wedge blocks 26 of the receiving probe assembly are placed on two opposite sides of the transmitting probe wedge 24.

Such an arrangement permits wave propagation to take place in a direction other than normal to the surface of the test piece.

In Figs. 9 and 10 there is illustrated still a further construction for this purpose the two probe assemblies in this case being formed by three blocks of right angle prismatic form the blocks 27 and 28 constituting the receiving probe assembly being of similar cross sectional dimensions and the third block 29 being of smaller cross section and located between the other two. The transmitting transducer 30 is mounted on the smaller block 29 and the receiving transducer comprises two parts 31 mounted on the larger blocks 27, 28 in the manner shown in Fig. 10 so as to lie in a plane parallel to and spaced from that containing the transmitting transducer and further from the surface of the piece to be tested.

In the arrangement shown in Fig. 11 the transmitting probe assembly comprises a row of spaced slabs 32 of methyl methacrylate known and sold in Great Britain in 1952 under the name of "Perspex" and the receiving probe assembly comprises a row of spaced blocks 33 of "Perspex," the receiving probes 33 being one more in number than the transmitting probes 32 and the transmitting probes 32 being mounted in the spaces respectively between the receiving probes 33.

In yet another arrangement as shown in Fig. 12 the transmitting probe assembly comprises four blocks 35 of "Perspex" mounted alongside the four sides respectively of the receiving probe slab 34.

Figs. 13 and 14 are a side sectional elevation and end sectional elevation respectively showing details of an apparatus according to the invention suitable for use in propagating vibrations of ultrasonic frequency in a body to be tested in a direction normal to a surface of the body, and comprising two probe assemblies. In this case one of the probe assemblies constituting a transmitting probe assembly is in the form of a thin slab 48 of "Perspex." The upper surface of the slab 48 is silvered and has a transducer in the form of a quartz crystal 36 held in contact therewith by means of a spring 37. The slab of "Perspex" 48 has its two ends supported in a recess in a block 38 of laminated "Bakelite." The recess in the "Bakelite" block 38 houses the crystal 36 and the spring 37 for holding the crystal 36 in contact with the silvered upper surface of the "Perspex" slab 48. The "Bakelite" block 38 is in turn affixed to a spacing block 39 also of laminated "Bakelite."

On two sides of the spacing block 39 are mounted two further "Perspex" probes 40 respectively. These probes 40 form part of a receiving probe assembly and have their lower faces 41 co-planar with the lower face of the transmitting probe 48 and their top faces co-planar with the top face of the spacing block 39 previously referred to. The inner sides of the two receiving probes 40 are silvered, as are the top faces thereof. Two receiving transducers in the form of quartz crystals 42 are held in contact with the top faces of the two receiving probes 40 respectively by means of springs 46.

Two further "Bakelite" blocks 43 and 44 are clamped to the outer faces of the two receiving probes 40 respectively and may be employed to hold a sheet of rubberised fabric 45 over the lower faces of the probes, this fabric serving as a coupling medium for the transmission of vibrations to and from the body to be tested.

Electrical contact is made to the crystals 36 and 42 through the springs 37 and 46 and the frequency of the oscillations applied to the transmitting crystal may be, say 2.5 mc./s. The gaps between the transmitting probe 48 and the two receiving probes 40 may be made small, for example, 0.5 mm. without introducing excessive acoustic coupling.

In order to complete the electrical screening of the receiving crystals 42 a metal cover 47 is placed over them, the metal cover making contact with the silver on the receiving probes 40. Thus complete electrical screening of the receiving crystals 42 can be achieved.

Since the transmitting and receiving crystals 36 and 42 are not connected to one another through a rigid mounting, acoustic insulation is facilitated.

Furthermore the crystals are protected against mechanical damage during use of the apparatus or rough surfaces.

The last described apparatus has been found to give satisfactory results over working ranges of from 0.08 inch to 10 feet.

The use of two receiving crystals offers advantage over the use of a single receiving crystal since in a plane perpendicular to the long dimensions of the transmitting and receiving crystals the combined directional characteristic can be made to cover a wide angle and to exhibit three nearly equal lobes. Cracks in castings at angles up to 15° relative to the normal at the centre of the transmitting probe have been detected.

When used for thickness measurement purposes apparatus as described has been found to provide accurate results down to thicknesses of 0.2 inch.

A further advantage lies in the fact that the use of long receiving probes ensures that all echoes are received at the receiving crystals well after the transmission of a pulse from the transmitting probe, even when the echoes are from flaws near the surface to which the transmitting probe is applied.

We claim:

Apparatus for the non-destructive testing of a solid body comprising vibration-transmitting means and vibration-receiving means for receiving vibrations from the vibration-transmitting means after reflection from said body, one of said means comprising two vibration-transmitting members, the other of said means comprising a further vibration-transmitting member disposed between and close to said two vibration-transmitting members, all said members having rectangular co-planar surfaces through which pass vibrations transmitted to and received from said body, and further surfaces, and an electromechanical transducer in vibration-transmitting relation to each of said further surfaces, the said further surfaces of said vibration-transmitting and said vibration-receiving means being spaced at different distances from said co-planar surfaces.

References Cited in the file of this patent

UNITED STATES PATENTS

| | | |
|---|---|---|
| 2,458,288 | Moriarty | Jan. 4, 1949 |
| 2,545,309 | Roberts | Mar. 13, 1951 |
| 2,602,327 | Bond | July 8, 1952 |
| 2,628,335 | Drake | Feb. 10, 1953 |
| 2,660,054 | Pringle | Nov. 24, 1953 |